Figure 1:
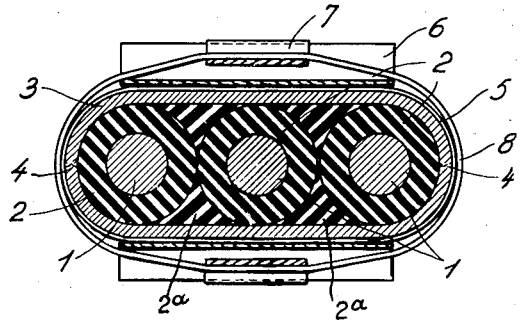

July 21, 1942.   J. S. MØLLERHØJ   2,290,698
ELECTRIC POWER CABLE
Filed April 13, 1940    2 Sheets-Sheet 1

July 21, 1942.   J. S. MØLLERHØJ   2,290,698
ELECTRIC POWER CABLE
Filed April 13, 1940   2 Sheets-Sheet 2

Patented July 21, 1942

2,290,698

UNITED STATES PATENT OFFICE 2,290,698

ELECTRIC POWER CABLE

Johannes Sørensen Møllerhøj, Charlottenlund, near Copenhagen, Denmark

Application April 13, 1940, Serial No. 329,542
In Denmark May 20, 1939

11 Claims. (Cl. 174—13)

The present invention relates to electric power cables including ordinarily high tension cables as well as such cables in which the dielectric, in order to increase the insulating power thereof, is maintained at a pressure above atmospheric pressure. This condition may be established in various ways, but the desired high pressures which for instance may reach 15 atmospheres heretofore could only with certainty be upheld by laying the cable into a continuous steel pipe conduit in which the pressure in question is found because the lead-covered cables previously known have only been able to permanently resist an internal pressure of a few atmospheres when exposed externally to atmospheric pressure even if they are provided with outer or inner bindings or reinforcements. This is due partly to the low mechanical strength of lead itself and partly to the weakness occurring in the longitudinal seam of the lead sheaths produced by means of common hydraulic lead presses.

Excessive stresses in the lead covering or sheath of cables with oil-impregnated paper insulation also occur at rising temperatures and consequent increase of the volume of the oil unless spaced pressure tanks etc. are used similar to those of the so-called oil filled cables, as a lead sheath armoured or reinforced in known manner can not to an appreciable extent be deformed elastically together with the armouring and is not protected against creeping of the lead due to the mechanical load.

The present invention has for its object to arrange the cable covering in such a way that throughout the length of the cable it can be subjected to elastic deformations at variations of the internal pressure, and that these deformations go on in such a manner that the covering is not subjected to detrimental deformations.

The invention, therefore, may be utilized not only in cables held under pressure by special means but also in ordinary electric power cables with oil impregnated paper insulation.

It is known per se to so form a multiple-core-cable with lead sheath as to provide flat portions of the sheath, as for instance in triple-core-cables the sheath has been formed so as to be coincident with the tangent common to subsequent insulated conductors situated in the apexes of an equilateral triangle whereby the sheath gets an approximately triangular cross-section instead of a circular one. In this case the purpose amongst other things has been to save material, particularly lead, and simultaneously the sheath becomes suitable for transferring an outer increased pressure, for instance if the cable has been drawn into the steel pipe conduit referred to above. For transferring such an outer increased pressure also serves the oval shape of conductor, insulation and lead sheath known for instance from certain single-core-cables.

Furthermore in lead-covered twin-core-cables and triple-core-cables it is known in order to save space and reduce costs to arrange the insulated conductors side by side within a flat lead sheath having a width corresponding to the number of conductors. However, in such cables the seams of the lead sheath are found at the middle of the broad sides of the cable.

The herein mentioned cables deviating from the circular shape of the lead sheath, however, if provided with an outer binding and armouring of usual kind will be unable to resist high inner pressures and this the much the more the cross-section of the sheath differs from the circular form.

Contradictory to this the electric power cable forming the subject matter of the present invention just is constructed to resist an inner pressure above atmospheric so that the dielectric may be maintained at the same pressure as that employed in the so-called oil-filled cables, viz. up to a pressure of a few atmospheres, or up to about 15 atmospheres as in the so-called pressure cables or gas pressure cables.

By the invention furthermore the internal channels or cavities and the spaced arrangement along the cable of pressure tanks known from oil-filled cables are made superfluous since the cables on account of its construction provides continuous equalization of the pressure throughout its length whereby at the same time greater freedom is ensured with regard to the choice of the viscosity of the oil.

The present invention relates to electric power cables capable of resisting an inner pressure above atmospheric and having a sheath of lead or equivalent material surrounding the insulated conductor construction and also an outer binding or armouring, said insulated conductor construction and consequently the sheath covering the same having in cross-section two opposed strongly curved or semicircular surface parts and therebetween two less curved or even flat surface parts, and the invention mainly consists therein that in order to elastically support the diaphragm surface formed by each broad side of the sheath against the permanent or accidental inner pressure of the cable there is arranged lengthwise of the cable between said broad side and the outer armouring or binding a continuous elastic metal tape extending substantially over the entire width of said broad side and formed with spaced transversely extending ribs, which metal tape is maintained in position by the outer armouring or binding.

By such a cable the above indicated effects are obtained since the two metal tapes due to the ribs are able in unison with the armouring to effectively and yet elastically support the diaphragm surfaces of the sheath against the inner pressure. Nevertheless the cable on account of its more or less flat cross-sectional formation and the said position of the ribs can be made sufficiently flexible longitudinally so that it can be readily handled and wound on large drums. The means, viz. the continuous elastic metal tapes with transversely extending ribs, for exerting an elastic pressure on the entire flat sides of the lead sheath can be manufactured and placed in position in the cable by ordinary simple manufacturing steps used in cable works. Besides the advantage is retained that the seam or seams, if any, of the lead sheath can be held in predetermined positions relative to the axis of the cross-section of the cable throughout the length of the cable.

Thus if the sheath is made with seam joints it is preferable to so form the sheath that these parts are situated at points where the armouring has bearing over a great angle (which in some cases may be not much less than 180°) whereby the seams are kept away from the diaphragm surfaces; furthermore the sheath may have increased thickness near the points where the seams are found, for instance in this way that the external surface and the internal surface of the sheath around the outermost conductors follow eccentric circles meeting tangentially with the surfaces of the flat or less curved parts which do not have increased thickness.

When for instance in a cable of this kind having two or more cores the individual insulation is dispensed with while the common insulation is retained an allied embodiment of the insulated conductor construction of a corresponding single-core-cable appears, it being only necessary to take care that the insulated conductor construction bears well along the two strongly curved parts of the sheath.

Figure 2:
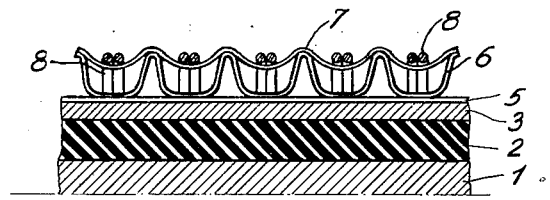
Figure 3:
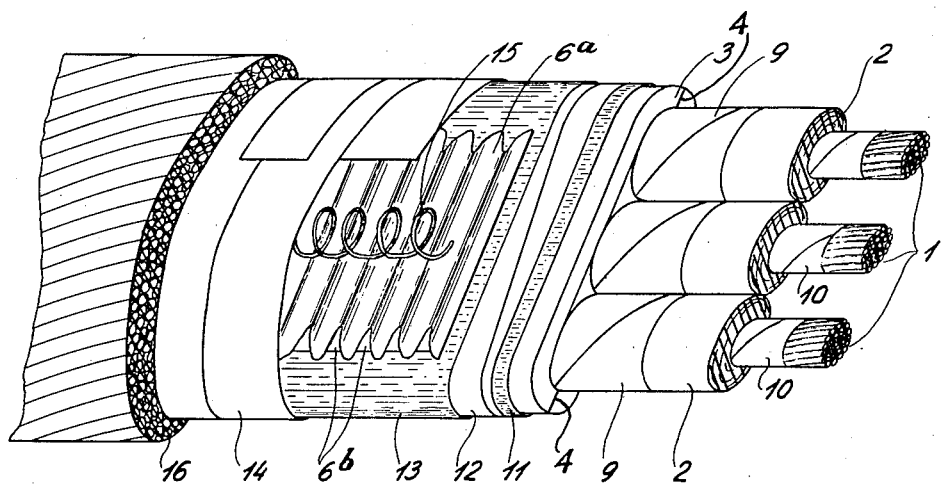
Figure 4:
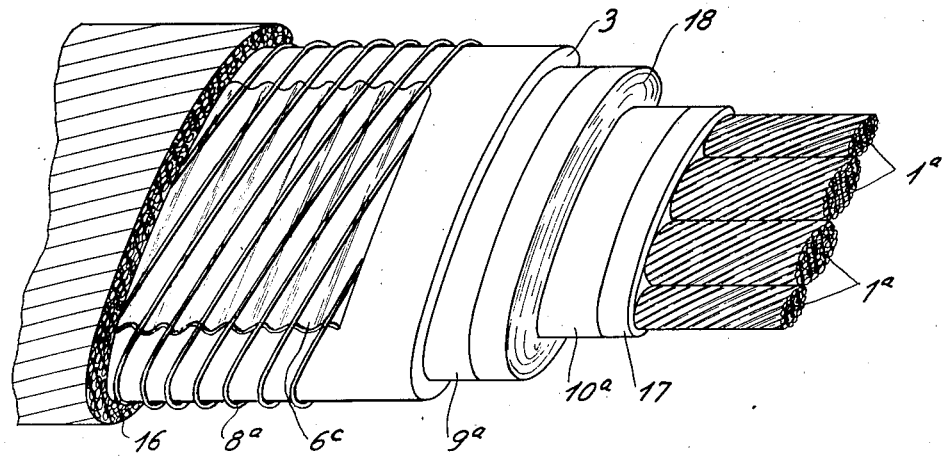
Figure 5:
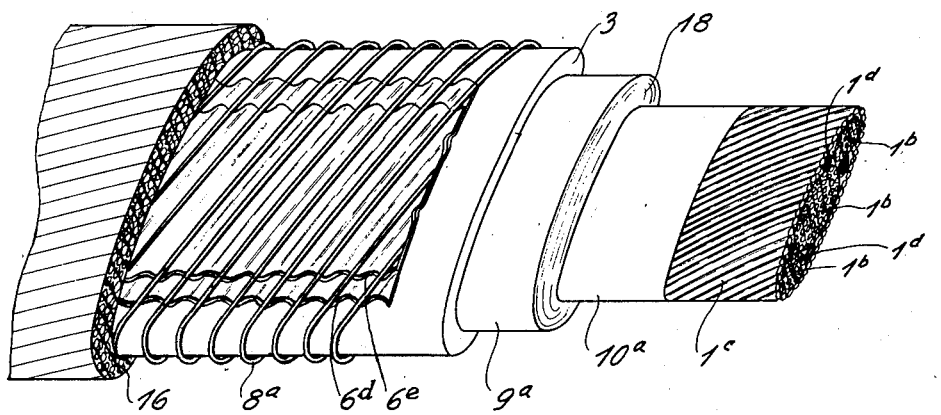
Figure 6:
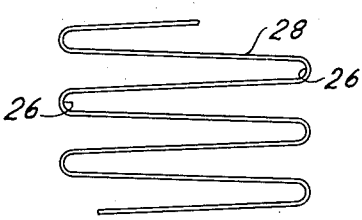
Figure 7:
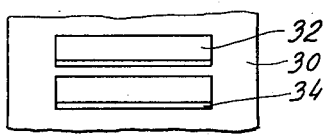

Further characteristic features of the invention will appear from the following description of embodiments of the present cable with reference to the accompanying drawings in which:

Figure 1 is a cross-section, partly diagrammatically of a triple-core-cable according to the invention, Figure 2 is a longitudinal section through part of the same cable, Figure 3 is a perspective view of another embodiment of a triple-core-cable, Figures 4 and 5 are perspective views of two different forms of single-core-cables according to the invention, Figure 6 is a plan view of a zigzag strip which may be used as a diaphragm supporting means, the straight parts of this strip being substantially perpendicular to the longitudinal direction of the cable, and Figure 7 is a plan view of a further form of a diaphragm supporting means formed as a strip having punched webs bent upwards so as to be perpendicular to the longitudinal direction of the cable.

The cable shown in Figures 1 and 2 has three conductors 1 whose centres are positioned on a straight line, and each conductor is surrounded by an insulating layer 2. 2$^a$ designates a further insulation common to all of the conductors. Around the conductor insulation there is pressed a lead sheath 3 extending at top and bottom as a straight line between the outermost conductors, and which besides follows the curved surface of the outwardly facing insulation of the outermost conductors. At the center of these curved surfaces the seams 4 of the lead sheath are found. Alternately the lead sheath may have a seam at one side only. Around the lead sheath 3 a tight armouring 5 is wound which for instance may consist of one or preferably two tapes of iron or bronze so that the lead sheath is completely covered and yet flexible. Over this armouring at the flat broad sides of the cable at top and bottom there is placed a continuous corrugated tape 6 made of sheet iron or sheet bronze. The tapes 6 extend transversely over the entire width of said broad sides. As is shown in Figure 2 these tapes may be bent in such a way as to provide narrow wave-crests and broad wave-troughs bearing slightly spaced on the cable so that there are small intervals only where the lead sheath is solely supported by the armouring 5.

However, in other cases it may be found more advantageous to give the corrugations symmetrical form. The waves of the tape mainly extend transversely of the cable. Over the wave-crests of each tape 6 there is placed a second corrugated tape 7 which is more narrow than the first-named tape and arranged opposite to the longitudinal center axis thereof throughout the length of the cable. The tapes 7 similar to the tapes 6 may consist of iron or bronze sheet.

The external binding of the cable for instance may consist of one or more iron or bronze wires 8 wound helically around the cable with a pitch equal to or different from the distance between adjacent wave-crests of the corrugated tapes 6 and 7. In Figure 2 two wires 8 are shown which are so wrapped as to pass between the waves of the tape 6 and rest against the wave-troughs of the tapes 7. At the narrow sides of the cable the wires bear on the armouring 5 and thereby exert a pressure against the lead sheath, the bearing surface at each side covering an angle of nearly 180°. Hereby the lead sheath is supported particularly well at the seams 4 and in the neighbourhood thereof whereby the risk of breaking of the sheath at the seams is materially reduced.

As the waves of the tapes 7 are much more shallow than those of the tapes 6 the binding wires 8 will be raised above the center of the flat lead sheath portions whereby the tensile stresses in the binding wires 8 in an advantageous manner are utilized in unison with the tapes 7 and 6 to elastically support the flat lead sheath portions so as to obtain the desired elastic diaphragm effect without a too great deflection taking place.

As shown in Figure 1 the wires 8 may bear not only against the tapes 7 opposite to the longitudinal axis of the diaphragm surface but also against the edges of the tapes 6 in the wave-troughs whereby the last-named tapes are particularly well supported, the deflection of the diaphragm surfaces at a certain pressure above atmospheric increasing gradually from both sides towards the center so that the lead is not deformed in an injurious manner, it being particularly not subjected to any substantial tensile stresses.

The illustrated and described supporting of the diaphragm surfaces of the cable sheath by means of the tapes 6 and 7 may be modified in various ways, the important thing being that the bindings or armourings and the continuous metal tapes formed with transversely extending ribs or the like form together elastic stiffening means for the diaphragm surfaces of the lead sheath. Furthermore it is essential to form the transversely stiffening support for the diaphragm surface in such a manner that the flexibility of the cable is not unduly restricted. This has been particularly well attained in the embodiment thus shown and described.

The outermost binding or armouring instead of the wires 8 may consist of one or more bands of suitable width and wound with a suitable pitch so that the tapes 6 at the lateral edges are supported at the wave-crests.

Of other closely related embodiments is to be named that each tape 7 while maintaining the tape 6 may be substituted by one or more wires which may be wound helically. Alternatively the tape 7 may be wholly omitted whether the outer armouring consists of tape or wire, and in the latter case the armouring may be so wrapped that at the lateral edges of the corrugated tape left it bears against the wave-troughs and at a distance therefrom it bears directly on the wave-crests of the corrugated tape, the armouring while wrapped being carried obliquely over said crests.

Figure 3 shows an embodiment of a triple-core cable including some well known details commonly used, but omitted in Figures 1 and 2.

In view of the high electric stresses metal foil or metal foil paper 9 is wrapped below the lead sheath 3 directly around the paper insulating layer 2, and furthermore beneath the latter around the individual strands 1 a similar wrapping 10 is used for eliminating detrimental spaces between the conductor surface and the paper insulation. The three insulated conductors are placed side by side as in Figures 1 and 2 to provide a flat cable.

Likewise in known manner the lead sheath 3 is wrapped first with an asphalted linen, paper or cotton tape 11, then with a thin bronze band 12 and finally with a second asphalted linen or similar tape 13.

The diaphragm surface supporting means here consist of an elastic continuous corrugated metal tape 6a having flattened or rounded ends 6b of the wave-crests, which tape 6a is supported by the outer armouring 14 consisting of double, wound metal bands in connection with a helically formed wire 15 placed lengthwise of the cable. 16 designates the ordinary corrosion protective covering of asphalted hemp or jute. Also in this construction the corrugated metal tapes cover the entire flat sides of the cable.

The lead sheath 3 is made thicker at the seams 4 by arranging its inner surface and its outer surface around the outermost conductors to allow eccentric circles meeting tangentially with the surfaces of the flat portions of the lead sheath so that along the curves the thickness increases gradually from above and from below towards the seams 4.

In Figures 4 and 5 parts corresponding to those of Figures 1, 2 and 3 are marked with the same reference numerals.

Figure 4 shows a single-core-cable whose four strands 1a are covered with a thin lead sheath 17 wrapped with metal foil or metal foil paper 10a over which the insulating layer 18, the metal foil or metal foil paper wrapping 9a and the lead sheath 3 is placed. A continuous corrugated metal tape 6c extending over each of the broad sides of the cable and elastically supporting the diaphragm surfaces of the sheath 3 is maintained in position by a wire armouring 8a whose windings are carried obliquely over the wave-crests of the corrugated tape.

Figure 5 also shows an embodiment of a single-core-cable according to the invention. Here the strands 1b instead of having a common thin lead sheath as in Figure 4 are wound with a common layer of conductor wires 1c and the spaces of the conductor construction are filled up with inlaid wires 1d to provide a flat or oval conductor form. Each of the broad sides of the cable is elastically supported by two continuous superimposed corrugated metal tapes 6d and 6e of different width. Here the wire armouring 8a is carried through the wave-troughs of the corrugations, the latter for facilitating such an arrangement being placed slightly inclined instead of perpendicularly to the longitudinal axis of the cable.

Both in Figures 4 and 5 the insulated, foil wrapped composite conductor has such a form as to be well suited for bearing against the narrow sides of the outer lead sheath.

The corrugated metal tape elastically supporting each diaphragm surface may be substituted by a zigzag-shaped ribbon placed edgewise for instance as shown in Figure 6. The bends 26 of the ribbon are smoothly curved and may be substituted by flat parts. The straight portions 28 of the ribbon have a suitable very small inclination so that the cable will be flexible longitudinally. In this case the armouring also may consist of tape instead of wire. Other forms of continuous metal tapes with transversely arranged ribs may be produced of ribbons with punched and upturned webs or lips.

In Figure 7 a ribbon 30 of this kind is shown, which ribbon has punched webs 34 bent perpendicularly to the ribbon thereby forming rectangular openings 32.

The ribbons herein mentioned and the zigzag-shaped ribbons indicated above may be used together with corrugated tapes, for instance such as the tape 7 in Figure 2, for forming the diaphragm support and carrying the outermost armouring or binding.

In operation the cable is filled up with a gaseous, liquid or semi-liquid insulating material which together with the paper insulation constitutes the cable insulation. When the insulation is subjected to pressure the diaphragm surfaces of the cable sheath will be deflected elastically, and on account of the elasticity of the armouring and the supporting corrugated or equivalently formed metal tapes the deflection of the diaphragm surfaces will adjust itself in accordance with expansions and contractions due to variations of temperature and the like to thereby stabilize the pressure.

When the cable is constructed as gas pressure cable the pressure can be provided by introducing gas after the finished installation of the cable stretch.

In the case of an oil-filled cable the pressure likewise may be established after the finished installation by introduction of oil under pressure into the joint sleeves or the terminal sleeves, if desired in connection with heating in order to reduce the viscosity of the oil provided that a sufficiently thin oil is not used, but the pressure may also be produced already in the individual manufacturing lengths of the cable before the installation thereof. In this latter case the desired pressure furthermore can be established prior to or after the armouring of the cable, if desired, in connection with heating when introducing oil under pressure, or the provision of the desired pressure may be made in connection with the armouring operation, so much oil then being introduced beforehand that the diaphragm surfaces get such a deflection that the pressure adjusts itself to the desired value due to the deformation occurring under the armouring process. If desired such a deflection of the diaphragm surfaces can be created already during the making of the sheath by means of a corresponding forming of the press tools (mandrel and matrice).

As in cables according to the invention thick oil may also be used the oil can easily be prevented from escaping to an appreciable degree during the installation. If desired, during installation of the sleeves the cable ends in question can be kept cooled at a suitable distance from the sleeve, to which finally sufficient oil is supplied under pressure.

For obviating any tendency of the cable to twist or turn some of the armourings may have mutually opposite directions of lay.

Having thus fully described my invention I claim as new and desire to secure by Letters Patent:

1. An electric power cable adapted to resist an inner pressure above atmospheric pressure, comprising in combination an insulated conductor construction having a substantially oval cross-sectional formation, a sheath surrounding said insulated conductor construction, an outer armouring, and a continuous elastic metal tape arranged lengthwise of the cable between each of the broad sides of the sheath and the outer armouring, said metal tape extending substantially over the width of said broad side and being formed with spaced transversely extending projections and maintained in position by the outer armouring so as to serve in unison therewith to elastically support said broad side of the sheath.

2. The electric power cable of claim 1, in which said elastic metal tape consists of a corrugated band whose waves extend substantially transversely of the broad side of the cable.

3. The electric power cable of claim 1, in which said elastic metal tape consists of a corrugated band having narrow wave-crests and broader wave-troughs which latter bear on the broad side of said sheath.

4. An electric power cable adapted to resist an inner pressure above atmospheric pressure, comprising in combination an insulated conductor construction having a substantially oval cross-sectional formation, an oval sheath surrounding said insulated conductor construction, an outer armouring, and, arranged lengthwise of the cable between each of the broad sides of the sheath and the outer armouring, a continuous elastic metal tape extending substantially over the width of said broad side and formed with spaced transversely extending projections, said metal tape being maintained in position by the outer armouring and serving in unison therewith to elastically support said broad side of the sheath, said sheath having a longitudinal seam arranged at a strongly curved part thereof where the armouring bears over a great angle.

5. The electric power cable of claim 4, in which said longitudinal seam is arranged approximately in the longitudinal center plane of the oval cross-section of the sheath.

6. An electric power cable adapted to resist an inner pressure above atmospheric pressure, comprising in combination an insulated conductor construction having in cross-section two opposed strongly curved surface parts and therebetween two less curved surface parts to thereby provide a substantially oval cross-sectional formation, a sheath surrounding said insulated conductor construction and conforming to the contour thereof, an outer armouring, and, arranged lengthwise of the cable between each of the broad sides of the sheath and the outer armouring, a continuous elastic metal tape extending substantially over the width of said broad side and formed with spaced transversely extending projections, said metal tape being maintained in position by the outer armouring and serving in unison therewith to elastically support said broad side of the sheath, the inner surfaces and the outer surfaces of said sheath at the strongly curved parts thereof being formed as halves of eccentric circles meeting tangentially with the surfaces of the less curved parts of the sheath to thereby provide gradually increased thickness of the same at said strongly curved surfaces.

7. An electric power cable adapted to resist an inner pressure above atmospheric pressure, comprising in combination an insulated conductor construction having a substantially oval cross-sectional formation, a sheath surrounding said insulated conductor construction, an outer armouring, and, arranged lengthwise of the cable between each of the broad sides of the sheath and the outer armouring, two continuous superimposed elastic corrugated metal tapes of different width, the broadest one being placed nearest to the sheath and extending substantially over the width of said broad side, said metal tapes being maintained in position by the outer armouring and serving in unison therewith to elastically support said broad side of the sheath.

8. The electric power cable of claim 7, in which said armouring consists of wire passing through the wave-troughs of the uppermost corrugated tapes and also through the laterally projecting parts of the wave-troughs of the lowermost broader corrugated tapes.

9. An electric power cable adapted to resist an inner pressure above atmospheric pressure, comprising in combination an insulated conductor construction having a substantially oval cross-sectional formation, a sheath surrounding said insulated conductor construction, a continuous elastic corrugated metal tape arranged lengthwise of the cable on each of the broad sides of the sheath, said corrugated metal tape extending substantially over the width of said broad side and having substantially transversely extending wave-crests and an outer metal armouring wound helically around said sheath and corrugated metal tapes in such a manner that those parts of the windings of said armouring extending over said tapes form an acute angle with the wave-crests thereof.

10. An electric power cable adapted to resist an inner pressure above atmospheric pressure, comprising in combination an insulated conductor construction having a substantially oval cross-sectional formation, a sheath surrounding said insulated conductor construction, an outer armouring, and, arranged lengthwise of the cable between each of the broad sides of the sheath and the outer armouring, a continuous elastic sheet metal tape extending substantially over the width of said broad side, said tape being maintained in position by the outer armouring and serving in unison therewith to elastically support said broad side of the sheath.

11. In an electric power cable adapted to resist an inner pressure above atmospheric pressure, in combination an insulated conductor construction having a substantially oval cross-sectional formation, an oval sheath surrounding said insulated conductor construction, a continuous elastic corrugated sheet metal tape arranged lengthwise of the cable on each of the broad sides of the sheath and extending substantially over the width of said broad side, and a binding consisting of a metal wire wound helically around said metal tapes and the strongly curved surfaces of said sheath at a pitch equal to the pitch of the waves of said tapes, said wire being placed in the wave troughs of said corrugated metal tapes at least at the longitudinal edges thereof and serving in unison with the corrugated metal tapes to elastically support said broad sides of the sheath against an inner pressure acting thereon.

JOHANNES SØRENSEN MØLLERHØJ.